US009080310B2

(12) United States Patent
Knussman et al.

(10) Patent No.: US 9,080,310 B2
(45) Date of Patent: Jul. 14, 2015

(54) CLOSED-LOOP HYDRAULIC SYSTEM HAVING REGENERATION CONFIGURATION

(75) Inventors: Michael L. Knussman, East Peoria, IL (US); Patrick Opdenbosch, Peoria, IL (US); Joshua Dierking, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 734 days.

(21) Appl. No.: 13/278,556

(22) Filed: Oct. 21, 2011

(65) Prior Publication Data

US 2013/0098464 A1 Apr. 25, 2013

(51) Int. Cl.
*F16D 31/02* (2006.01)
*F15B 13/042* (2006.01)
(Continued)

(52) U.S. Cl.
CPC ............ *E02F 9/2217* (2013.01); *E02F 9/2235* (2013.01); *E02F 9/2285* (2013.01); *E02F 9/2289* (2013.01); *F15B 11/003* (2013.01); *F15B 11/024* (2013.01); *F15B 11/0423* (2013.01); *F15B 7/006* (2013.01); *F15B 2211/20553* (2013.01); *F15B 2211/20561* (2013.01); *F15B 2211/20569* (2013.01); *F15B 2211/27* (2013.01); *F15B 2211/3058* (2013.01); *F15B 2211/30515* (2013.01); *F15B 2211/50527* (2013.01); *F15B 2211/50563* (2013.01);
(Continued)

(58) Field of Classification Search
USPC .................. 60/443, 444, 468, 473, 475, 476; 91/437
See application file for complete search history.

(56) References Cited

U.S. PATENT DOCUMENTS

| | | | |
|---|---|---|---|
| 4,369,625 A | | 1/1983 | Izumi et al. |
| 4,449,366 A | | 5/1984 | Sato et al. |

(Continued)

FOREIGN PATENT DOCUMENTS

| | | |
|---|---|---|
| EP | 1 598 561 | 11/2005 |
| GB | 2 269 425 | 2/1994 |

(Continued)

OTHER PUBLICATIONS

Linjama, M. (2011) entitled “Digital Fluid Power—State of the Art”, The 12$^{th}$ Scandinavian International Conference on Fluid Power, May 18-20, 2011 Tampere, Finland.

(Continued)

*Primary Examiner* — Michael Leslie
(74) *Attorney, Agent, or Firm* — Finnegan, Henderson, Farabow, Garrett & Dunner LLP

(57) ABSTRACT

A hydraulic system is disclosed that has first and second passages connecting a pump to an actuator in closed-loop manner, and first and second load-holding valves within the first and second passages. The hydraulic system may also have a regeneration valve connected to the first and second passages between the actuator and the first and second load-holding valves to selectively connect the first and second passages. The hydraulic system may further have a controller configured to cause a control valve to simultaneous move the first and second load-holding valves toward flow-blocking positions when pump displacement is about zero. The controller may also be configured to selectively cause the regeneration valve to connect the first and second passages when pump displacement is non-zero, and to cause only one of the first and second load-holding valves to move to its flow-blocking position when the regeneration valve connects the first and second passages.

20 Claims, 6 Drawing Sheets

(51) Int. Cl.

| | |
|---|---|
| ***E02F 9/22*** | (2006.01) |
| ***F15B 11/00*** | (2006.01) |
| ***F15B 11/024*** | (2006.01) |
| ***F15B 11/042*** | (2006.01) |
| *F15B 7/00* | (2006.01) |

(52) U.S. Cl.

CPC ..... *F15B2211/613* (2013.01); *F15B 2211/625* (2013.01); *F15B 2211/6346* (2013.01); *F15B 2211/6652* (2013.01); *F15B 2211/761* (2013.01); *F15B 2211/785* (2013.01); *F15B 2211/88* (2013.01)

(56) References Cited

U.S. PATENT DOCUMENTS

| | | | | |
|---|---|---|---|---|
| 4,561,249 | A | 12/1985 | Watanabe et al. | |
| 4,586,330 | A | 5/1986 | Watanabe et al. | |
| 4,768,339 | A | 9/1988 | Aoyagi et al. | |
| 4,833,798 | A | 5/1989 | Ehrich | |
| 5,048,293 | A | 9/1991 | Aoyagi | |
| 5,329,767 | A | 7/1994 | Hewett | |
| 6,330,797 | B1 | 12/2001 | Kondo | |
| 6,745,992 | B2 | 6/2004 | Yang et al. | |
| 6,789,335 | B1 | 9/2004 | Kinugawa et al. | |
| 6,918,247 | B1 | 7/2005 | Warner | |
| 7,243,591 | B2 | 7/2007 | Dixen et al. | |
| 7,260,931 | B2 | 8/2007 | Egelja et al. | |
| 7,272,928 | B2 | 9/2007 | Ariga et al. | |
| 7,412,827 | B2 | 8/2008 | Verkuilen | |
| 7,434,391 | B2 | 10/2008 | Asam et al. | |
| 7,490,421 | B1 | 2/2009 | Pletzer et al. | |
| 7,516,613 | B2 | 4/2009 | Kadlicko | |
| 7,596,893 | B2 | 10/2009 | Tozawa et al. | |
| 7,752,842 | B2 | 7/2010 | Hristov et al. | |
| 7,827,787 | B2 * | 11/2010 | Cherney et al. | 60/414 |
| 7,908,048 | B2 * | 3/2011 | Vigholm et al. | 60/327 |
| 8,225,706 | B2 * | 7/2012 | Vigholm et al. | 91/437 |
| 2004/0083629 | A1 | 5/2004 | Kondou | |
| 2004/0123499 | A1 | 7/2004 | Arii | |
| 2005/0012337 | A1 | 1/2005 | Yoshimatsu | |
| 2005/0036894 | A1 | 2/2005 | Oguri | |
| 2007/0044463 | A1 | 3/2007 | VerKuilen et al. | |
| 2008/0250783 | A1 | 10/2008 | Griswold | |
| 2008/0300757 | A1 | 12/2008 | Kanayama et al. | |
| 2008/0302099 | A1 | 12/2008 | Vigholm et al. | |
| 2008/0314038 | A1 | 12/2008 | Tozawa et al. | |
| 2009/0165450 | A1 | 7/2009 | Cherney et al. | |
| 2009/0288408 | A1 | 11/2009 | Tozawa et al. | |
| 2010/0000209 | A1 | 1/2010 | Wada et al. | |
| 2010/0000211 | A1 | 1/2010 | Ikeda et al. | |
| 2010/0043420 | A1 | 2/2010 | Ikeda et al. | |
| 2010/0107620 | A1 | 5/2010 | Nelson et al. | |
| 2010/0115936 | A1 | 5/2010 | Williamson et al. | |
| 2010/0162593 | A1 | 7/2010 | Hughes, IV et al. | |
| 2010/0162885 | A1 | 7/2010 | Hughes, IV et al. | |
| 2010/0163258 | A1 | 7/2010 | Hughes, IV et al. | |
| 2010/0218493 | A1 | 9/2010 | Nakamura et al. | |
| 2011/0029206 | A1 | 2/2011 | Kang et al. | |
| 2011/0030364 | A1 | 2/2011 | Persson et al. | |

FOREIGN PATENT DOCUMENTS

| | | | |
|---|---|---|---|
| JP | 56-016735 | | 2/1981 |
| JP | 57-134007 | | 8/1982 |
| JP | 58-044133 | | 3/1983 |
| JP | 02-108733 | | 4/1990 |
| JP | 06-057786 | | 3/1994 |
| JP | 06-081375 | A | 3/1994 |
| JP | 10-96402 | | 4/1998 |
| JP | 2006-118685 | | 5/2006 |
| JP | 2007-247701 | | 9/2007 |
| JP | 2011-069432 | | 4/2011 |
| WO | WO 2005/024246 | | 3/2005 |
| WO | WO 2009/084853 | | 7/2009 |
| WO | WO 2009/123047 | | 10/2009 |
| WO | WO 2010/040890 | | 4/2010 |
| WO | WO 2011/041410 | | 4/2011 |

OTHER PUBLICATIONS

Zimmerman, J. PhD Student/Purdue University, Center for Compact and Efficient Fluid Power PowerPoint Presentation, 2010 Annual Meeting (Jun. 14).

Zimmerman, J. et al., "Hybrid Displacement Controlled Multi-Actuator Hydraulic Systems", The Twelfth Scandinavian International Conference on Fluid Power , Tampere, Finland (May 18-20, 2011).

Brezonick, M., entitled "The Potential of Pump-Controlled Hydraulics", Hydraulic Horizons, Diesel Progress North American Edition (Jan. 2009).

Zick, J., entitled "Verbesserte Leistungsausnutzung bei Erdbaumaschinen durch optimal Pumpensteuerung", Olhydraulic und pneumatic 20 (1976) Nr. 4.

* cited by examiner

CLOSED-LOOP HYDRAULIC SYSTEM HAVING REGENERATION CONFIGURATION

TECHNICAL FIELD

The present disclosure relates generally to a hydraulic system and, more particularly, to a closed-loop hydraulic system having a regeneration configuration.

BACKGROUND

Machines such as excavators, dozers, loaders, motor graders, and other types of heavy equipment use one or more hydraulic actuators to move a work tool. These actuators are fluidly connected to a pump on the machine that provides pressurized fluid to chambers within the actuators. As the pressurized fluid moves into or through the chambers, the pressure of the fluid acts on hydraulic surfaces of the chambers to affect movement of the actuator and the connected work tool. In an open-loop hydraulic system, fluid discharged from the actuator is directed into a low-pressure sump, from which the pump draws fluid. In a closed-loop hydraulic system, fluid discharged from the actuator is directed back into the pump and immediately recirculated.

Regeneration within an open-loop system may help to increase an efficiency and/or speed of the system. Regeneration during extension of a hydraulic cylinder is typically accomplished by connecting a rod-end chamber of a hydraulic actuator directly with a head-end chamber of the same actuator, while also supplying fluid from the pump to the head-end chamber. As the pressure within both chambers during regeneration may be about equal, the hydraulic cylinder will extend due to an imbalance of forces created by the pressure acting on disproportionate areas within the two chambers. Because the head-end of the hydraulic cylinder is being supplied with fluid both from the pump and from the rod-end chamber during extension regeneration, the hydraulic cylinder may be able to move faster and/or have fewer losses than otherwise possible.

Regeneration within a closed-loop system has historically not been as effective as within the open-loop system described above. In particular, when the rod-end of a hydraulic cylinder is directly connected to the head-end of the same cylinder, the closed-loop system may be pressure-limited by associated charge relief valves that are generally required within a closed-loop system. Although high-pressures may not be necessary during extension regeneration, an open-loop system operating at higher pressures will generally outperform a closed-loop system operating at lower pressures.

An exemplary closed-loop system having enhanced regeneration is disclosed in Japanese Patent 2011/069432 of Takashi et al. that published on Apr. 7, 2011 (the '432 patent). The '432 patent describes an over-center, variable displacement pump connected to a hydraulic cylinder. During normal operation, the pump is connected to the hydraulic cylinder in closed-loop manner. However, during regeneration, the pump is connected to only one chamber of the hydraulic cylinder in an open-loop manner. An accumulator is utilized to selectively store high-pressure fluid discharged from the hydraulic cylinder during regeneration and to selectively supply fluid to the pump during normal operation. A charge circuit provides makeup fluid to the pump during open-loop operation.

Although an improvement over conventional hydraulic systems that have a permanent closed-loop configuration, the system of the '432 patent described above may still be less than optimal. In particular, the system of the '432 patent may be overly complex, expensive, and difficult to control. For example, the system of the '432 patent may include a great number of different types of valves that control complicated fluid flows throughout the system. These valves, along with the associated fluid flows, increase an overall cost of the system, while simultaneously increasing computing and control requirements.

The hydraulic system of the present disclosure is directed toward solving one or more of the problems set forth above and/or other problems of the prior art.

SUMMARY

In one aspect, the present disclosure is directed to a hydraulic system. The hydraulic system may include an actuator, a pump having variable displacement, and first and second passages connecting the pump to the actuator in a closed-loop manner. The hydraulic system may also include a first load-holding valve disposed within the first passage and movable between a flow-blocking position and a flow-passing position, and a second load-holding valve disposed within the second passage and movable between a flow-blocking position and a flow-passing position. The hydraulic system may further include a regeneration valve connected to the first passage at a location between the actuator and the first load-holding valve and to the second passage at a location between the actuator and the second load-holding valve. The regeneration valve may be configured to selectively fluidly connect the first passage with the second passage. The hydraulic system may additionally include a control valve configured to initiate simultaneous movements of the first and second load-holding valves, and a controller in communication with the pump, the control valve, and the regeneration valve. The controller may be configured to cause the control valve to initiate simultaneous movement of the first and second load-holding valves toward their flow-blocking positions when a displacement of the pump is about zero, and to selectively cause the regeneration valve to fluidly connect the first passage with the second passage when the displacement of the pump is non-zero. The controller may also be configured to cause only one of the first and second load-holding valves to move to its flow-blocking position when the regeneration valve fluidly connects the first passage with the second passage.

In yet another aspect, the present disclosure is directed to a method of operating a hydraulic system. The method may include pressurizing fluid with a pump, and directing fluid from the pump through an actuator and back to the pump in a closed-loop manner via first and second passages. The method may also include selectively simultaneously blocking the first and second passages with first and second load-holding valves to inhibit movement of the actuator when a displacement of the pump is about zero, and selectively fluidly connecting the first passage with the second passage at locations between the actuator and the first and second load-holding valves via a regeneration valve when the displacement of the pump is non-zero. The method may further include selectively blocking only one of the first and second passages with the first or second load-holding valves when the first and second passages are fluidly communicated with each other via the regeneration valve.

DETAILED DESCRIPTION

Figure 1:
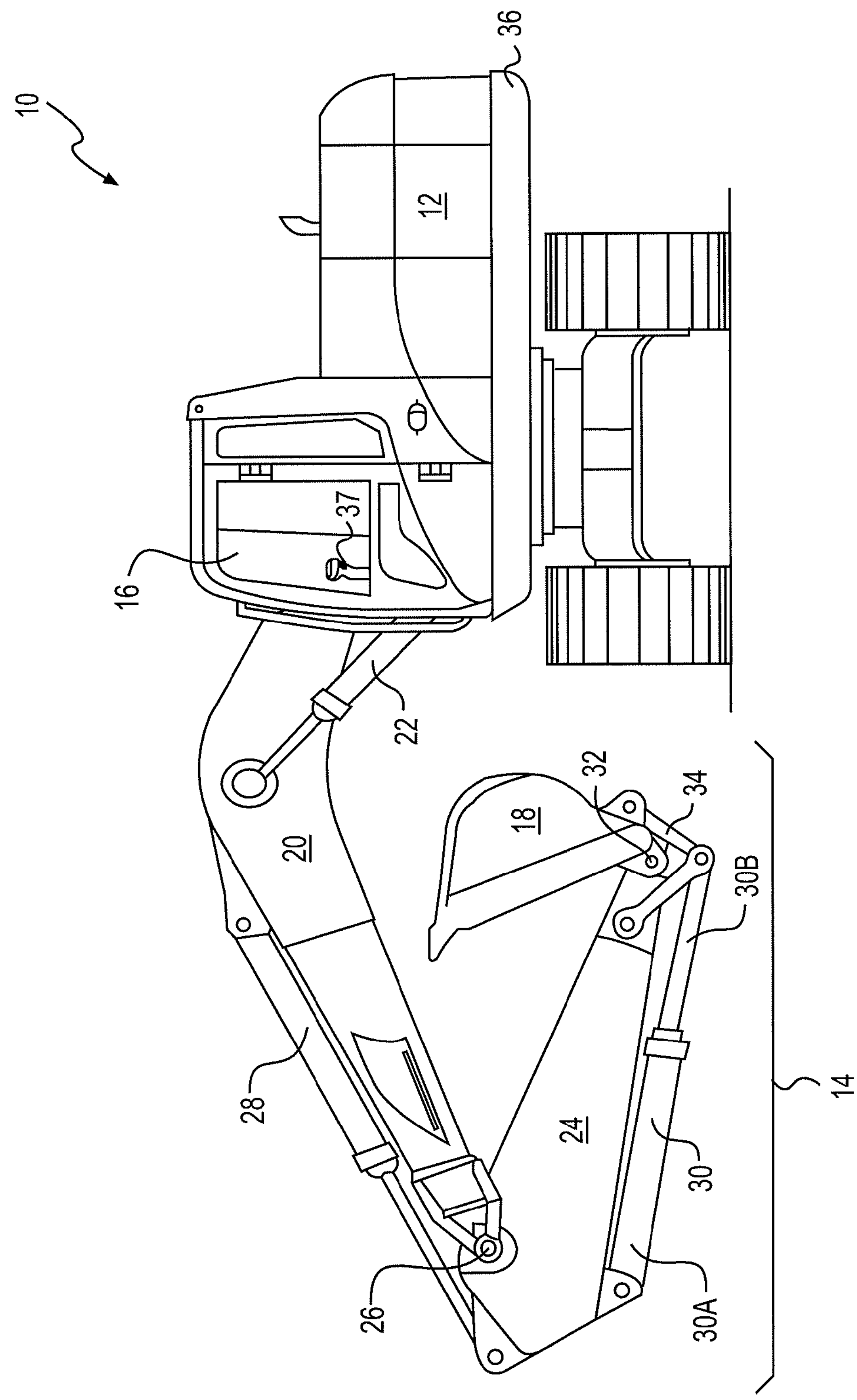
FIG. 1 is a pictorial illustration of an exemplary disclosed machine.

FIG. 1 illustrates an exemplary machine 10. Machine 10 may be a fixed or mobile machine that performs some type of operation associated with an industry, such as mining, construction, farming, transportation, or another industry known in the art. For example, machine 10 may be an earth moving machine such as an excavator (shown in FIG. 1), a backhoe, a loader, or a motor grader. Machine 10 may include a power source 12, a tool system 14 driven by power source 12, and an operator station 16 situated for manual control of tool system 14.

Tool system 14 may include linkage acted on by hydraulic actuators to move a work tool 18. For example, tool system 14 may include a boom 20 that is vertically pivotal about a horizontal boom axis (not shown) by a pair of adjacent, double-acting, hydraulic cylinders 22 (only one shown in FIG. 1), and a stick 24 that is vertically pivotal about a stick axis 26 by a single, double-acting, hydraulic cylinder 28. Tool system 14 may further include a single, double-acting, hydraulic cylinder 30 that is connected to vertically pivot work tool 18 about a tool axis 32. In one embodiment, hydraulic cylinder 30 may be connected at a head-end 30A to a portion of stick 24 and at an opposing rod-end 30B to work tool 18 by way of a power link 34. Boom 20 may be pivotally connected to a frame 36 of machine 10, while stick 24 may pivotally connect work tool 18 to boom 20. It should be noted that other types and configurations of linkages and actuators may be associated with machine 10, as desired.

Operator station 16 may include devices that receive input from a machine operator indicative of desired machine maneuvering. Specifically, operator station 16 may include one or more operator interface devices 37, for example a joystick, a steering wheel, or a pedal, that are located proximate an operator seat (not shown). Operator interface devices 37 may initiate movement of machine 10, for example travel and/or tool movement, by producing displacement signals that are indicative of desired machine maneuvering. As an operator moves interface device 37, the operator may affect a corresponding machine movement in a desired direction, with a desired speed, and/or with a desired force.

Figure 2:
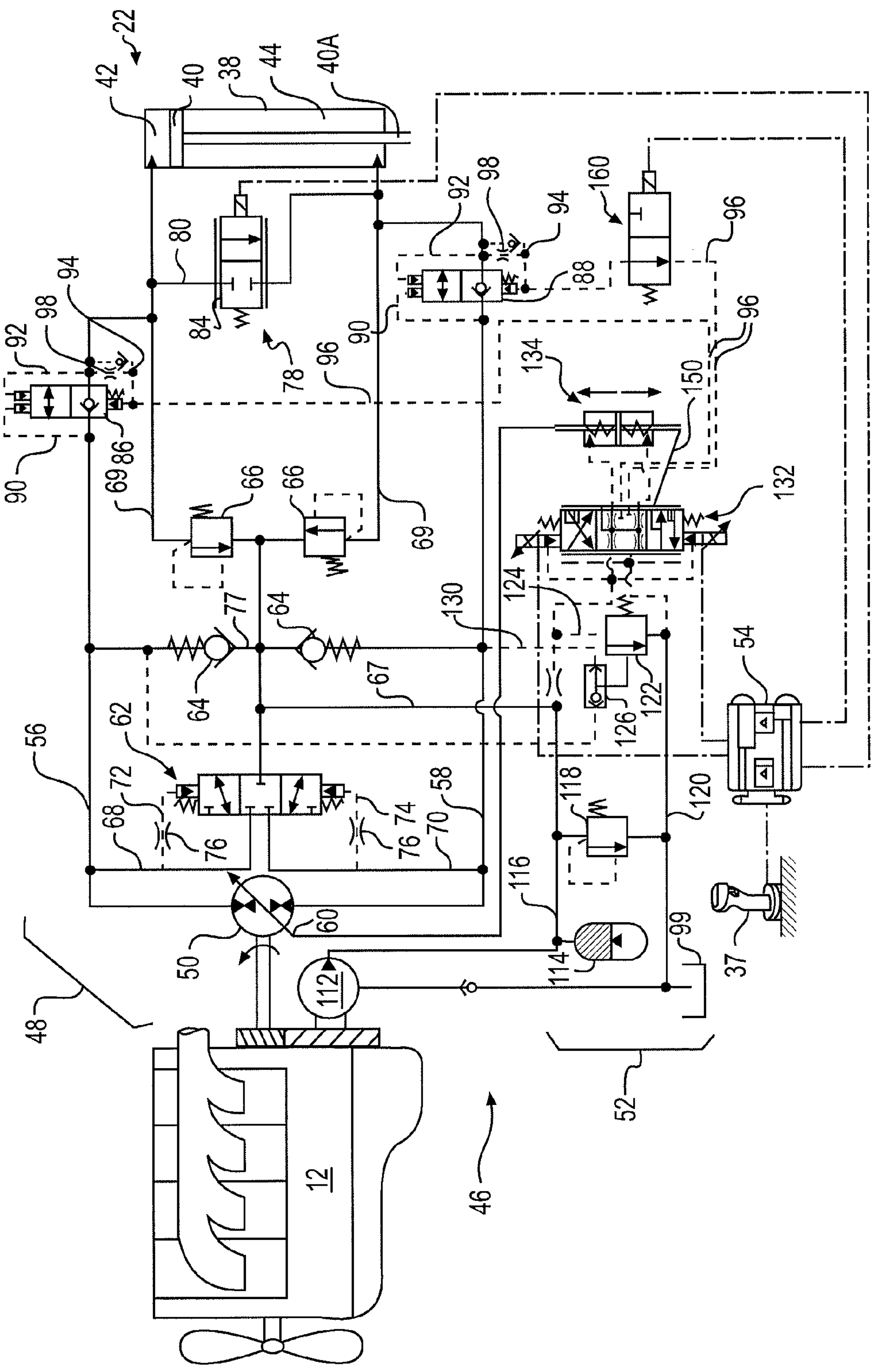
FIG. 2 is a schematic illustration of an exemplary disclosed hydraulic system that may be used in conjunction with the machine of FIG. 1.

For purposes of simplicity, FIG. 2 illustrates the composition and connections of only hydraulic cylinder 22. It should be noted, however, that hydraulic cylinders 28, 30, and/or any other hydraulic actuator of machine 10, may have a similar composition and/or be hydraulically connected in a similar manner, if desired.

As shown in FIG. 2, hydraulic cylinder 22 may include a tube 38 and a piston assembly 40 arranged within tube 38 to form a first chamber 42 and an opposing second chamber 44. In one example, a rod portion 40A of piston assembly 40 may extend through an end of second chamber 44. As such, second chamber 44 may be considered the rod-end chamber of hydraulic cylinder 22, while first chamber 42 may be considered the head-end chamber.

First and second chambers 42, 44 may each be selectively supplied with pressurized fluid and drained of the pressurized fluid to cause piston assembly 40 to displace within tube 38, thereby changing an effective length of hydraulic cylinder 22 and moving (i.e., lifting and lowering) boom 20 (referring to FIG. 1). A flow rate of fluid into and out of first and second chambers 42, 44 may relate to a translational velocity of hydraulic cylinder 22 and a lifting velocity of boom 20, while a pressure differential between first and second chambers 42, 44 may relate to a force imparted by hydraulic cylinder 22 on boom 20 and by boom 20 on stick 24. An expansion and a retraction of hydraulic cylinder 22 may function to assist in moving boom 20 in different manners (e.g., lifting and lowering boom 20, respectively).

To help regulate filling and draining of first and second chambers 42, 44, machine 10 may include a hydraulic system 46 having a plurality of interconnecting and cooperating fluid components. Hydraulic system 46 may include, among other things, a primary circuit 48 configured to connect a primary pump 50 to hydraulic cylinder 22 in a generally closed-loop manner, a charge circuit 52 configured to selectively accumulate excess fluid from and discharge makeup fluid to primary circuit 48, and a controller 54 configured to control operations of primary and charge circuits 48, 52 in response to input from the operator received via interface device 37.

Primary circuit 48 may include a head-end passage 56 and a rod-end passage 58 forming the generally closed loop between primary pump 50 and hydraulic cylinder 22. During an extending operation, head-end passage 56 may be filled with fluid pressurized by primary pump 50, while rod-end passage 58 may be filled with fluid returned from hydraulic cylinder 22. In contrast, during a retracting operation, rod-end passage 58 may be filled with fluid pressurized by primary pump 50, while head-end passage 56 may be filled with fluid returned from hydraulic cylinder 22.

Primary pump 50 may have variable displacement and be controlled to draw fluid from hydraulic cylinder 22 and discharge the fluid at a specified elevated pressure back to hydraulic cylinder 22 in two different directions. That is, primary pump 50 may include a stroke-adjusting mechanism 60, for example a swashplate, a position of which is hydro-mechanically adjusted by a displacement actuator 134 based on, among other things, a desired speed of hydraulic cylinder 22 to thereby vary an output (e.g., a discharge rate) of primary pump 50. The displacement of pump 50 may be adjusted from a zero displacement position at which substantially no fluid is discharged from primary pump 50, to a maximum displacement position in a first direction at which fluid is discharged from primary pump 50 at a maximum rate into head-end passage 56. Likewise, the displacement of pump 50 may be adjusted from the zero displacement position to a maximum displacement position in a second direction at which fluid is discharged from primary pump 50 at a maximum rate into rod-end passage 58. Primary pump 50 may be drivably connected to power source 12 of machine 10 by, for example, a countershaft, a belt, or in another suitable manner. Alternatively, primary pump 50 may be indirectly connected to power source 12 via a torque converter, a gear box, an electrical circuit, or in any other manner known in the art.

Primary pump 50 may also selectively be operated as a motor. More specifically, when an extension or a retraction of hydraulic cylinder 22 is in the same direction as a force acting on boom 20, the fluid discharged from hydraulic cylinder 22 may be elevated and function to drive primary pump 50 to rotate with or without assistance from power source 12. Under some circumstances, primary pump 50 may even be capable of imparting energy to power source 12, thereby improving an efficiency and/or capacity of power source 12.

It will be appreciated by those of skill in the art that the respective rates of hydraulic fluid flow into and out of first and second chambers 42, 44 during extension and retraction of hydraulic cylinder 22 may not be equal. That is, because of the location of rod portion 40A within second chamber 44, piston assembly 40 may have a reduced pressure area within second chamber 44, as compared with a pressure area within first chamber 42. Accordingly, during retraction of hydraulic cylinder 22, more hydraulic fluid may flow out of first chamber 42 than can be consumed by second chamber 44 and, during extension of hydraulic cylinder 22, more hydraulic fluid may be required to flow into first chamber 42 than flows out of second chamber 44. In order to accommodate the excess fluid during retraction and the need for additional fluid during extension, primary circuit 48 may be provided with a primary makeup valve (PMV) 62, two secondary makeup valves (SMV) 64, and two relief valves 66, each connected to charge circuit 52 via a passage 67.

PMV 62 may be a pilot-operated three-position valve movable based on a pressure differential between head- and rod-end passages 56, 58. In particular, PMV 62 may be movable from a first position (middle position shown in FIG. 2) at which fluid flow through PMV 62 may be inhibited, to a second position (lower position shown in FIG. 2) at which fluid flow from passage 67 through PMV 62 into head-end passage 56 is allowed via a makeup passage 68, and to a third position (upper position shown in FIG. 2) at which fluid flow from passage 67 through PMV 62 into rod-end passage 58 is allowed via a makeup passage 70. A first pilot passage 72 may connect a pilot pressure signal from makeup passage 68 to an end of PMV 62 to urge PMV 62 toward the second position, while a second pilot passage 74 may connect a pilot pressure signal from makeup passage 70 to an opposing end of PMV 62 to urge PMV 62 toward the third position. When the pressure signal within first pilot passage 72 sufficiently exceeds the pressure signal within second pilot passage 74 (i.e., exceeds by an amount about equal to or greater than a centering spring bias of PMV 62), PMV 62 may move toward the second position, and when the pressure signal within second pilot passage 74 sufficiently exceeds the pressure signal within first pilot passage 72, PMV 62 may move toward the third position. First and second pilot passages 72, 74 may each include a fixed restrictive orifice 76 that helps to reduce pressure oscillations having a potential to cause instabilities in movement of PMV 62. PMV 62 may be spring-centered toward the first position.

It should be noted that when PMV 62 is in the first position, flow through PMV 62 may either be completely blocked or only restricted to inhibit flow by a desired amount. That is, PMV 62 could include restrictive orifices (not shown) that block some or all fluid flow when PMV 62 is in the first position, if desired. The use of restrictive orifices may be helpful during situations where primary pump 50 does not return to a perfect zero displacement when commanded to neutral. Accordingly, any reference to the first position of PMV 62 as being a flow-inhibiting position is intended to include both a completely blocked condition and a condition wherein flow through PMV 62 is limited but still possible.

Although restrictive orifices 76 within first and second pilot passages 72, 74 may help reduce instabilities associated with PMV 62, they may also slow a reaction of PMV 62. Accordingly, SMVs 64 may be provided within a passage 77 connecting passage 67 with head- and rod-end passages 56, 58 to enhance responsiveness of primary circuit 48. In the disclosed embodiment, SMVs 64 may be check-type valves that are operative at set pressure differentials between passage 67 and head- and rod-end passages 56, 58, respectively. It will be appreciated that the SMVs 64 may unseat to permit flow only into primary circuit 48 when the pressure of fluid within passage 67 is greater than fluid pressures in head- and rod-end passages 56, 58, respectively.

Relief valves 66 may be provided to permit flow between head- and rod-end passages 56, 58 and passage 67, allowing fluid to be relieved from primary circuit 48 into charge circuit 52 when a pressure of the fluid exceeds a set threshold of relief valves 66. Relief valves 66 may be set to operate at relatively high pressure levels in order to prevent damage to hydraulic system 46, for example at levels that may only be reached when piston assembly 40 reaches an end-of-stroke position and the flow from primary pump 50 is non-zero, or during a failure condition of hydraulic system 46. Relief valves 66 may connect via relief passages 69 to head- and rod-end passages 56, 58 at or near ports of first and second chambers 42, 44, for example at locations between any load-holding valves and hydraulic cylinder 22.

In order to help reduce a likelihood of primary pump 50 overspeeding during a motoring retraction of hydraulic cylinder 22 (i.e., during a retraction in which a load is acting in the same direction as movement of hydraulic cylinder 22), to increase a speed of hydraulic cylinder 22 during an extension, and/or to recuperate otherwise wasted hydraulic energy, primary circuit 48 may be provided with at least one regeneration valve 78. Regeneration valve 78 may be disposed within a regeneration passage 80 that extends between head- and rod-end passages 56, 58, and include a valve element 84 that is movable between a first or flow-blocking position (shown in FIG. 2) and a second or flow-passing position. When regeneration valve 78 is in the flow-passing position, some or all of the fluid discharged from first chamber 42 may be directly routed into second chamber 44 (and/or vice versa), without the fluid first passing through primary pump 50. In some configurations, regeneration valve 78 may only be moved to the flow-passing position during a motoring retraction or an extension, and movement of regeneration valve 78 may be accomplished electrically when commanded to do so by controller 54. Control of regeneration valve 78 will be described in more detail below.

Primary circuit 48 may be provided with load-holding valves 86 and 88 to inhibit unintended motion of tool system 14 (referring to FIG. 1). Load-holding valves 86, 88 may be associated with head- and rod-end passages 56, 58, respectively, and located between the connection locations of regeneration valve 78 and primary pump 50. Load-holding valves 86, 88 may be configured to simultaneously inhibit fluid flow to and from the associated chambers of hydraulic cylinder 22, thereby locking the movement of hydraulic cylinder 22 when movement of hydraulic cylinder 22 has not been requested by the operator of machine 10. In addition, as will be described in more detail below, one of load-holding valves 86, 88 (e.g., load-holding valve 88) may be selectively used to inhibit fluid returning from second chamber 44 of hydraulic cylinder 22 back to primary pump 50 during a regeneration event, such that a greater amount of fluid exiting second chamber 44 flows through regeneration valve 78 into first chamber 42. During the regeneration event, primary pump 50 may receive makeup fluid from charge circuit 52 instead of from hydraulic cylinder 22.

Each of load-holding valves 86, 88 may include a first or default position (shown in FIG. 2) at which substantially no fluid flow from hydraulic cylinder 22 through load-holding valves 86, 88 is allowed, and a second or active position at which flow through load-holding valves 86, 88 and movement of hydraulic cylinder 22 is substantially unrestricted by load-holding valves 86, 88. Load-holding valves 86, 88 may be urged toward their default positions when movement of hydraulic cylinder 22 is not requested (e.g., when displacement of pump 50 is about zero), and moved toward their active positions when movement is requested (e.g., when displacement of pump 50 is non-zero).

Each load-holding valve 86, 88 may be hydraulically operated to move between the flow-passing and flow-blocking positions. In particular, each load-holding valve 86, 88 may include a pump-side pilot passage (PSPP) 90, a first actuator-side pilot passage (FASPP) 92, a second actuator-side pilot passage (SASPP) 94, and a control pilot passage (CPP) 96. A restrictive orifice 98 may be disposed within each SASPP 94 that provides for a restriction in fluid flow through SASPP 94. Pressurized fluid from within PSPP 90 and FASPP 92 may act separately on a first end of each load-holding valve 86, 88 to urge the corresponding valve toward its flow-passing position, while pressurized fluid from within SASPP 94 and CPP 96 may act together with a spring-bias on an opposing second end of each load-holding valve 86, 88 to urge the valve towards its flow-blocking position. In order to facilitate movement of load-holding valves 86, 88 from their flow-blocking positions toward their flow-passing positions, CPP 96 may be selectively reduced in pressure, for example by way of connection to a low-pressure tank 99 of charge circuit 52. When CPP 96 is connected to tank 99, fluid from within PSPP 90 and/or FASPP 92 may generate a combined force during movement of hydraulic cylinder 22 that is sufficient to overcome the spring bias of load-holding valves 86, 88 and move load-holding valves 86, 88 to their active positions. To move load-holding valves 86, 88 to their default positions, CPP 96 may be pressurized with fluid (or at least blocked and allowed to be pressurized with fluid discharged from hydraulic cylinder 22), the resulting force combined with the spring bias acting at the second end of load-holding valves 86, 88 being sufficient to overcome any force generated at the opposing end of load-holding valves 86, 88. With this configuration, even if tool system 14 is loaded and generating force on hydraulic cylinder 22, any pressure buildup between load-holding valves 86, 88 and hydraulic cylinder 22 caused by the loading may be communicated with both the first and second ends of load-holding valves 86, 88 via FASPP 92 and SASPP 94, thereby counteracting each other and allowing the pressure within CPP 96 to control motion of load-holding valves 86, 88. In fact, in some embodiments, a pressure area of load-holding valves 86, 88 exposed to SASPP 94 may be greater than a pressure area exposed to FASPP 92 such that any buildup of pressure caused by the loading of tool system 14 may actually result in a greater valve-closing force (i.e., a greater force urging load-holding valves 86, 88 toward their flow-blocking positions) for a given pressure buildup. Details of the selective connection of CPP 96 to tank 99 will be discussed in greater detail below.

Charge circuit 52 may include at least one hydraulic source fluidly connected to passage 67 described above. For example, charge circuit 52 may include a charge pump 112 and/or an accumulator 114, both of which may be fluidly connected to passage 67 via a common passage 116 to provide makeup fluid to primary circuit 48. Charge pump 112 may embody, for example, an engine-driven, fixed-displacement pump configured to draw fluid from tank 99, pressurize the fluid, and discharge the fluid into passage 67 via common passage 116. Accumulator 114 may embody, for example, a compressed gas, membrane/spring, or bladder type of accumulator configured to accumulate pressurized fluid from and discharge pressurized fluid into common passage 116. Excess hydraulic fluid, either from charge pump 112 or from primary circuit 48 (i.e., from operation of primary pump 50 and/or hydraulic cylinder 22) may be directed into either accumulator 114 or into tank 99 by way of a charge pilot valve 118 disposed in a return passage 120. Charge pilot valve 118 may be movable from a flow-blocking position toward a flow-passing position as a result of fluid pressures within common passage 116 and passage 67.

Figure 3:
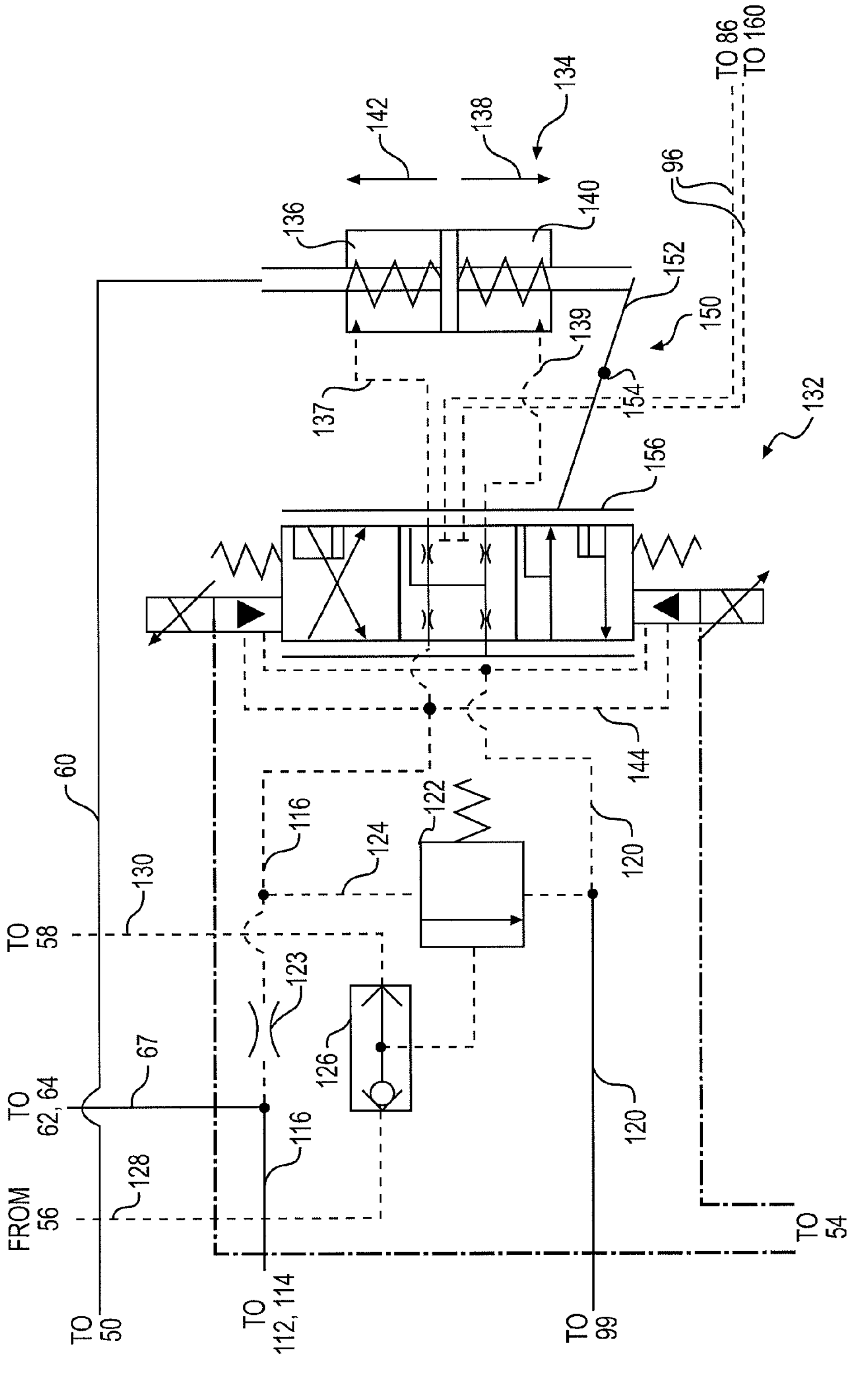
FIG. 3 is a schematic illustration of an exemplary disclosed displacement control valve that forms a portion of the hydraulic system of FIG. 2.

As shown in FIGS. 2 and 3, a pressure relief valve 122 may be disposed within a drain passage 124 that extends between common passage 116 and return passage 120 to regulate fluid flow from charge circuit 52 into tank 99, and a restrictive orifice 123 may be disposed within common passage 116 between passage 67 and drain passage 124. Pressure relief valve 122 may be pilot-operated and spring-biased to move between a first position at which fluid flow into tank 99 is inhibited, and a second position at which fluid is allowed to flow from common passage 116 into return passage 120. Pressure relief valve 122 may be spring-biased toward the first position, and movable toward the second position when a pressure acting on pressure relief valve 122 generates a force exceeding the spring bias of pressure relief valve 122. A resolver 126 may be disposed to selectively communicate a pilot signal via pilot passages 128, 130 from the higher-pressure one of head- and rod-end passages 56, 58 with pressure relief valve 122 to allow the signal to act on pressure relief valve 122 and urge pressure relief valve 122 toward the second position. Restrictive orifice 123 may help to dampen pressure oscillations within common passage 116 and somewhat isolate fluid makeup operations from displacement control operations associated with primary pump 50. When pressure relief valve 122 is moved to its second or flow-passing position, the pressure of fluid within passage 116 downstream of restrictive orifice 123 may drop and result in movement of displacement actuator 134 to a lesser displacement value (possibly to zero). This will happen, for example, when hydraulic actuator 22 reaches its end of stroke position or is acting against a sufficiently high load. It should be noted that the form of override described above can also be implemented as a power-override, if desired, during which circuit pressures are not resolved but instead act simultaneously to bring the displacement of actuator 134 to a zero value.

FIG. 3 illustrates a portion of charge circuit 52 that is configured to affect displacement control of primary pump 50 (i.e., movement of displacement actuator 134) and operation of load-holding valves 86, 88. In particular, FIG. 3 shows a displacement control valve 132 configured to control motion of displacement actuator 134, which may be mechanically connected to stroke-adjusting mechanism 60 of primary pump 50. In the illustrated embodiment, displacement control valve 132 is a solenoid-actuated, three-position valve that is movable by pilot pressure in response to control signals from controller 54 (referring to FIG. 2). It should be noted, however, that although displacement actuator 134 is shown and described as being electro-hydraulically controlled, it is contemplated that displacement actuator 134 may alternatively be purely mechanically or hydro-mechanically controlled, if desired.

When displacement control valve 132 is in the first position (middle shown in FIG. 3), fluid pressures within first and second chambers 136, 140 of displacement actuator 134 may be substantially balanced (i.e., first and second chambers 136, 140 may be exposed to substantially similar pressures) such that displacement actuator 134 is spring-biased toward a neutral position that substantially returns the displacement of primary pump 50 to a zero-displacement setting. In particular, when displacement control valve 132 is in the first position, first and second chambers 136, 140 of displacement actuator 134 may be fluidly communicated with common passage 116 leading to charge pump 112 and accumulator 114 and simultaneously communicated with return passage 120 leading to tank 99. The simultaneous connection of both first and second chambers 136, 140 to common passage 116 and return passage 120 may allow for an equal amount of pressure buildup within first and second chambers 136, 140 that is less than a full pressure of common passage 116. This equal and slightly elevated, yet limited, pressure (e.g., about 2-3 MPa) within first and second chambers 136, 140 may facilitate movement of displacement actuator 134 to its neutral or zero-displacement position while also providing for a quick displacement response of primary pump 50 during subsequent movement of displacement control valve 132 to its second or third positions. When displacement control valve 132 is in the first position, controller 54 may allow regeneration valve 78 to be spring-biased to its flow-blocking position, thereby inhibiting fluid flow from rod-end passage 58 to head-end passage 56 via regeneration passage 80. CPP 96 may be blocked at this time by displacement control valve 132, to facilitate movement of load-holding valves 86, 88 to their flow-blocking positions.

When displacement control valve 132 is in the second position (the lower position shown in FIG. 3), fluid may be allowed to flow from charge pump 112 and/or accumulator 114 into first chamber 136 of displacement actuator 134 via common passage 116 and a pilot passage 137 to urge displacement actuator 134 to move in a first direction indicated by an arrow 138. At this same time, fluid may be allowed to drain from second chamber 140 of displacement actuator 134, and from CPP 96 associated with load-holding valves 86, 88 into tank 99 via pilot passage 139 and return passage 120. When displacement control valve 132 is in the second position, controller 54 may allow regeneration valve 78 to be spring-biased to its flow-blocking position, thereby inhibiting fluid flow from head-end passage 56 to rod-end passage 58 (and vice versa) via passage 80. CPP 96 may be unblocked at this time, to facilitate movement of load-holding valves 86, 88 to their flow-passing positions.

When displacement control valve 132 is in the third position (i.e., the upper position shown in FIG. 3), fluid may be allowed to flow from charge pump 112 and/or accumulator 114 into second chamber 140 of displacement actuator 134 via common passage 116 and pilot passage 139 to urge displacement actuator 134 to move in a second direction indicated by an arrow 142. At this same time, fluid may be allowed to drain from first chamber 136 of displacement actuator 134 via pilot passage 137 and from load-holding valves 86, 88 into tank 99 via return passage 120. When displacement control valve 132 is in the third position, controller 54 may cause regeneration valve 78 to move to its flow-passing position, thereby allowing fluid flow from rod-end passage 58 to head-end passage 56 via regeneration passage 80. CPP 96 may be unblocked at this time, to facilitate movement of load-holding valves 86, 88 to their flow-passing positions.

Displacement control valve 132 may be spring-biased toward the first position and selectively moved by pressurized fluid from common passage 116 acting on ends of displacement control valve 132 via a pilot passage 144 into the second and third positions based on signals from controller 54. Flows of pressurized fluid into first and second chambers 136, 140 of displacement actuator 134 that are achieved when displacement control valve 132 is in the first and second positions, respectively, may affect the motion of displacement actuator 134. Those of skill in the art will appreciate that the motion of displacement actuator 134 may control the position of stroke-adjusting mechanism 60, and, hence, the displacement of primary pump 50 and associated flow rates and directions of fluid flow through head- and rod-end passages 56, 58. When displacement control valve 132 is in the first position, stroke-adjusting mechanism 60 may be centered or "zeroed" by biasing forces, such that primary pump 50 may have substantially zero displacement (i.e., such that primary pump 50 may be displacing a negligible amount of fluid, if any, into either of head- or rod-end passages 56, 58). When displacement control valve 132 is in the second position, displacement actuator 134 may be shifted downward (relative to the embodiment of FIG. 3) to provide a negative displacement of primary pump 50 (a displacement of fluid into rod-end passage 58), the resulting angle or position of stroke-adjusting mechanism 60 determining a volume of fluid displaced. When displacement control valve 132 is in the third position, displacement actuator 134 may be shifted upward (relative to the embodiment of FIG. 3) to provide a positive displacement of primary pump 50 (a displacement of fluid into head-end passage 56), the resulting angle or position of stroke-adjusting mechanism 60 determining a volume of fluid displaced.

In some embodiments, displacement actuator 134 may be provided with a mechanical feedback device 150 that is configured to adjust an operating state of displacement control valve 132 as displacement actuator 134 is actuated. As shown in FIG. 3, mechanical feedback device 150 may include a link 152 that is pivotally restrained at a midpoint 154, and a movable cage portion 156 that is connected to a first end of link 152. In some embodiments, movable cage portion 156 may actually form a portion of pilot passages 137, 139. Link 152 may also be connected at a second end to displacement actuator 134, such that as displacement actuator 134 translates between the positive and negative displacement positions, link 152 may pivot about midpoint 154 and cause movable cage portion 156 to slide. As movable cage portion 156 moves in response to movement of displacement actuator 134 toward a greater displacement position, passages 137 and 139 may be increasingly restricted and eventually become blocked. In this manner, mechanical feedback device 150 may facilitate incremental movement of displacement actuator 134 in response to movement of displacement control valve 132.

During operation, the operator of machine 10 may utilize interface device 37 (referring to FIG. 2) to provide a signal that identifies the desired movement of hydraulic cylinder 22 to controller 54. Based upon one or more signals, including the signal from interface device 37, and, for example, a current position of hydraulic cylinder 22, controller 54 may command displacement control valve 132 to advance to a particular one of the first-third positions and, depending on pressure differences between first and second chambers 42, 44, issue corresponding commands to regeneration valve 78.

Controller 54 may embody a single microprocessor or multiple microprocessors that include components for controlling operations of hydraulic system 46 based on input from an operator of machine 10 and based on sensed or other known operational parameters. Numerous commercially available microprocessors can be configured to perform the functions of controller 54. It should be appreciated that controller 54 could readily be embodied in a general machine microprocessor capable of controlling numerous machine functions. Controller 54 may include a memory, a secondary storage device, a processor, and any other components for running an application. Various other circuits may be associated with controller 54 such as power supply circuitry, signal conditioning circuitry, solenoid driver circuitry, and other types of circuitry.

During operation of machine 10 under regeneration conditions (e.g., under extension regeneration conditions), it may be desirable to redirect as much fluid as possible from second chamber 44 into first chamber 42 such that a maximum speed of work tool 14 may be achieved. In addition, it may also be desirable to substantially isolate second chamber 44 from primary pump 50 during retraction regeneration, when a pressure within first chamber 42 is higher than a pressure within second chamber 44, such that energy loss via regeneration valve 84 may be reduced. Redirecting a maximum amount of fluid from second chamber 44 into first chamber 42 during extension regeneration and isolating second chamber 44 from first chamber 44 during retraction regeneration may be achieved in several different ways.

In the embodiment of FIG. 2, an additional regeneration control valve 160 may be provided to selectively prevent fluid return from second chamber 44 to primary pump 50 during an extension regeneration event. Regeneration control valve 160 may be disposed within CPP 96, between with load-holding valve 88 and displacement control valve 132, and operable between a flow-blocking and a flow-passing position. As described above, when fluid flow through CPP 96 is blocked (normally by displacement control valve 132 when the displacement of primary pump 50 is about zero), pressure may build within CPP 96, causing load-holding valve 88 to move to its flow-blocking position. When load-holding valve 88 is in its flow-blocking position and regeneration valve 78 is in its flow-passing position, fluid discharged from second chamber 44 may be inhibited from returning to primary pump 50, thereby resulting in a greater flow of fluid being redirected through regeneration valve 78 to first chamber 42. Regeneration control valve 160 may be spring-biased toward the flow-passing position and solenoid-operable to the flow-blocking position in response to a command signal from controller 54.

Figure 4:
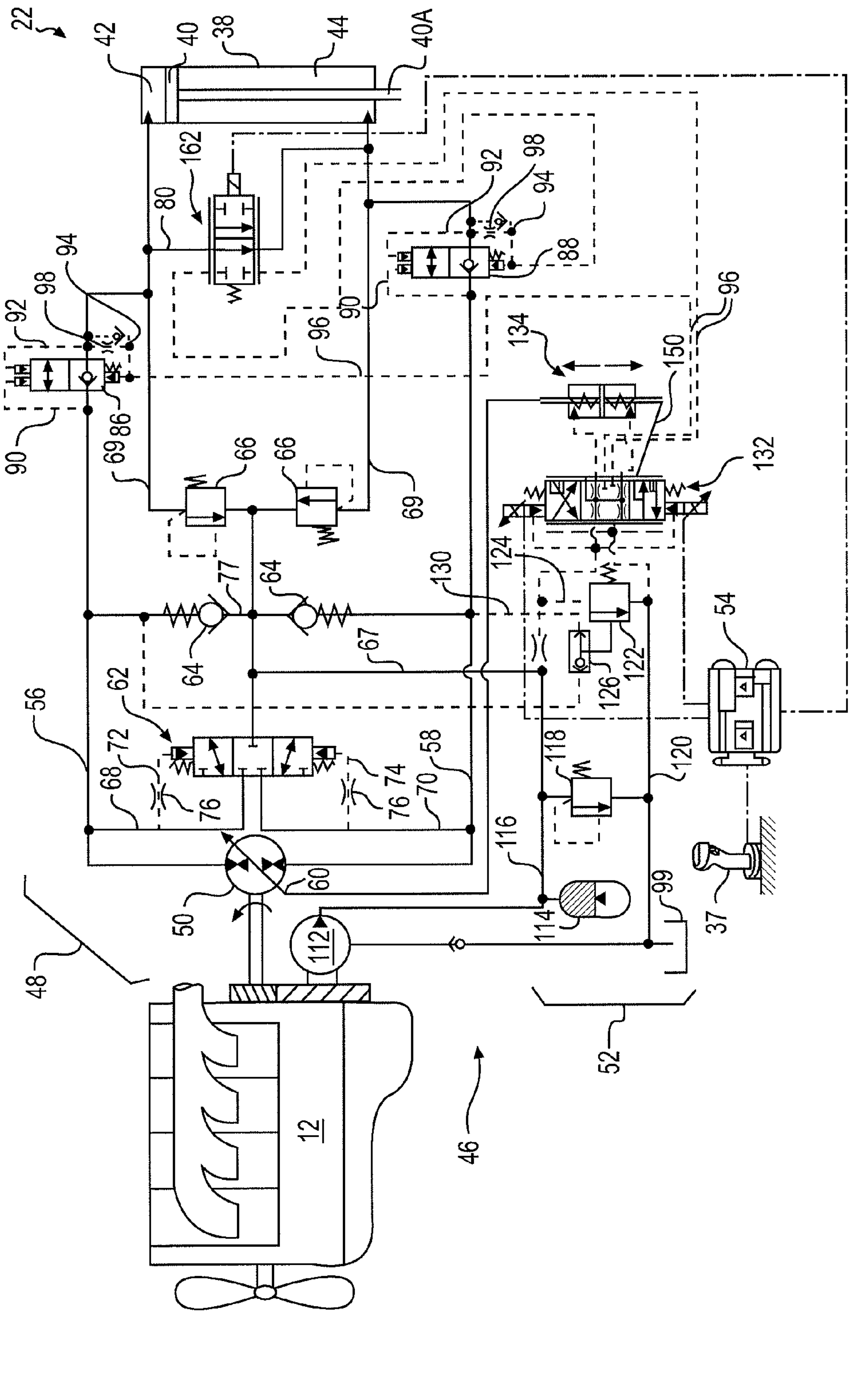
FIG. 4 is a schematic illustration of another exemplary disclosed hydraulic system that may be used in conjunction with the machine of FIG. 1.

In the embodiment of FIG. 4, regeneration valve 78 may be replaced with a regeneration valve 162 that is capable of both controlling fluid flow through passage 80 (in a manner similar to that described above for regeneration valve 78) and controlling fluid flow through CPP 96 associated with load-holding valve 88 (in a manner similar to that described above for regeneration control valve 160). In particular, regeneration valve 162 may be capable of moving from a first position at which fluid flow through passage 80 is inhibited and fluid flow through CPP 96 is substantially unrestricted by regeneration valve 162, and a second position at which fluid flow through passage 80 is substantially unrestricted by regeneration valve 162 and fluid flow through CPP 96 is inhibited. As described above, when fluid flow through CPP 96 is inhibited, load-holding valve 88 may be moved to its flow-blocking position such that fluid discharged from second chamber 44 is prevented from returning to primary pump 50 and instead is redirected into first chamber 42 via passage 80.

Figure 5:
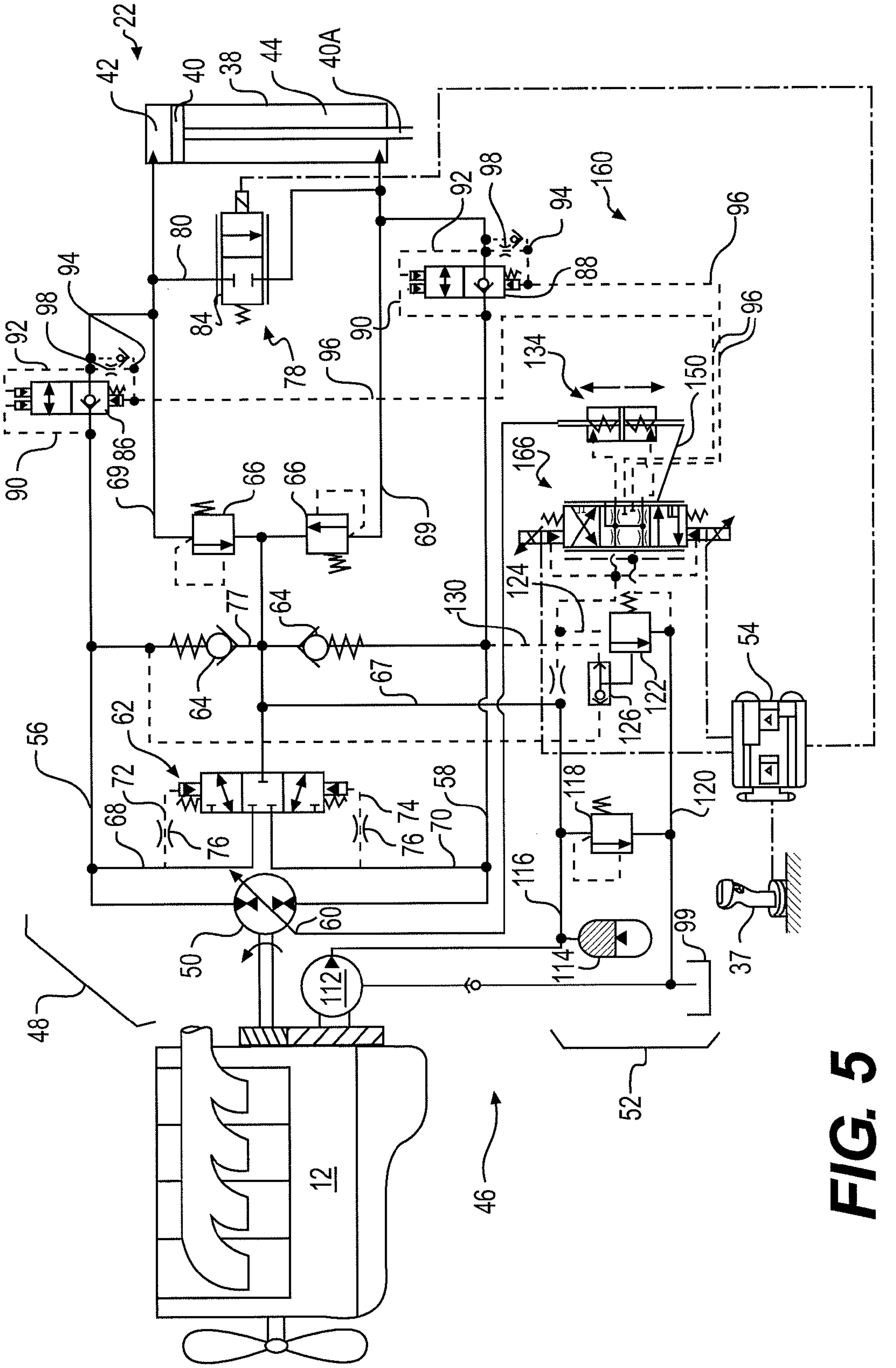
FIG. 5 is a schematic illustration of another exemplary disclosed hydraulic system that may be used in conjunction with the machine of FIG. 1.
Figure 6:
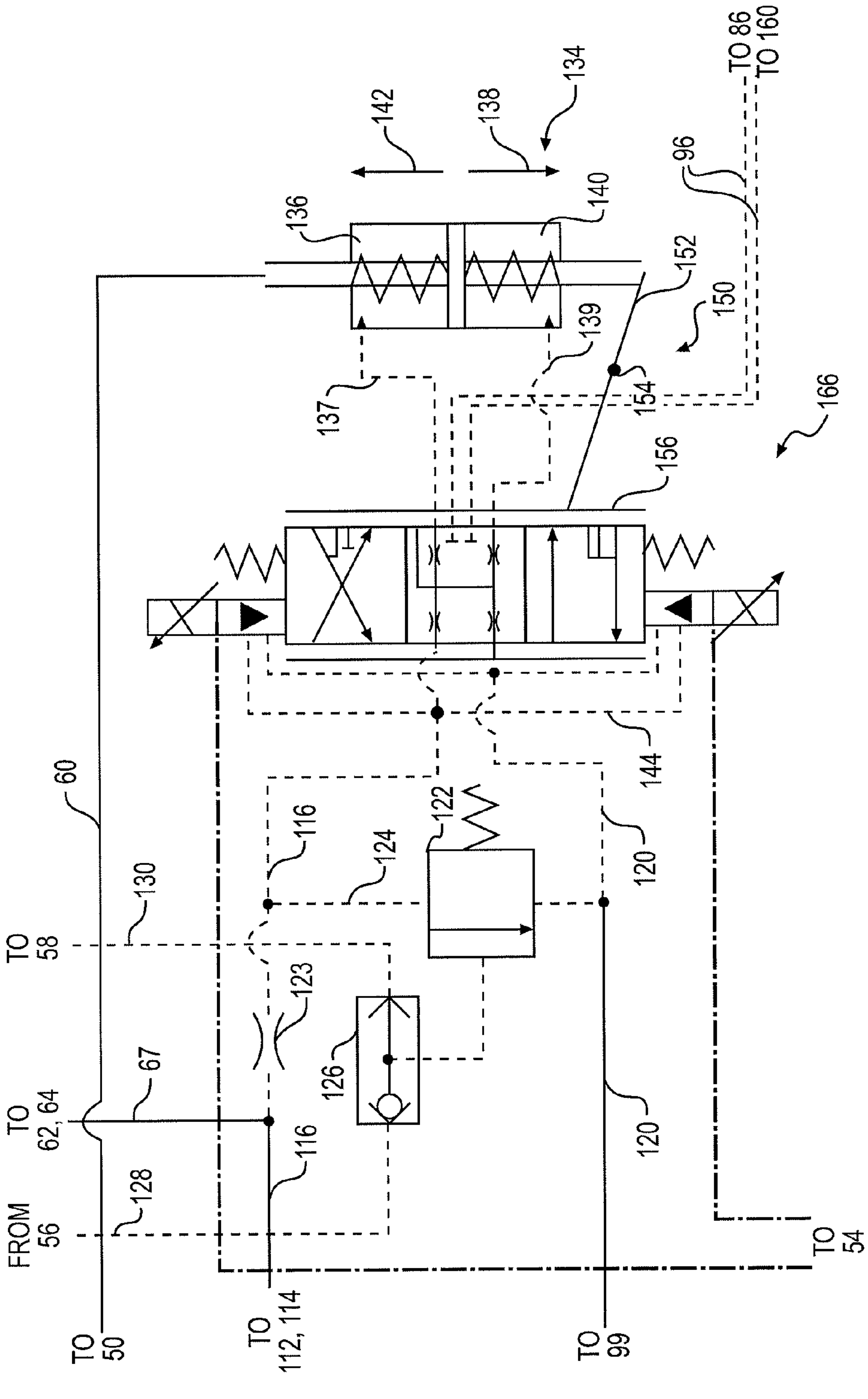
FIG. 6 is a schematic illustration of an exemplary disclosed displacement control valve that forms a portion of the hydraulic system of FIG. 5.

In the embodiment of FIGS. 5 and 6, displacement control valve 132 may be replaced with a displacement control valve 166 that is capable of both controlling simultaneous movement of load-holding valves 86, 88 during an inactive condition (i.e., during a condition where primary pump 50 has a displacement of about zero) and controlling movement of only load-holding valve 88 during a regeneration event (in which primary pump 50 has a non-zero displacement). Specifically, displacement control valve 166 may have first and second positions (middle and lower positions shown in FIGS. 5 and 6) similar to the first and second positions (middle and lower positions shown in FIGS. 2-4) of displacement control valve 132. The third position (upper position shown in FIGS. 5 and 6) of displacement control valve 166, however, may be different than the third position (upper position shown in FIGS. 2-4) of displacement control valve 132. That is, when the valve element of displacement control valve 166 is in the third position, only CPP 96 of load-holding valve 86 may be fluidly communicated with tank 99, while CPP 96 of load-holding valve 88 may be blocked by control valve 166. As described above, when fluid flow through CPP 96 is inhibited, load-holding valve 88 may be moved to its flow-blocking position such that fluid discharged from second chamber 44 is prevented from returning to primary pump 50 and instead is redirected into first chamber 42 via passage 80.

INDUSTRIAL APPLICABILITY

The disclosed hydraulic system may be applicable to any machine where improved hydraulic efficiency and performance is desired. The disclosed hydraulic system may provide for improved efficiency through the use of closed-loop and meterless technology. The disclosed hydraulic system may provide for enhanced performance through the selective use of novel primary and charge circuits. Operation of hydraulic system 46 will now be described.

During operation of machine 10, an operator located within station 16 may command a particular motion of work tool 18 in a desired direction and at a desired velocity by way of interface device 37. One or more corresponding signals generated by interface device 37 may be provided to controller 54 indicative of the desired motion, along with machine performance information, for example sensor data such a pressure data, position data, speed data, pump displacement data, and other data known in the art.

In response to the signals from interface device 37 and based on the machine performance information, controller 54 may generate control signals directed to displacement control valve 132 causing displacement control valve 132 to move to one of the first-third positions described above. For example, to retract hydraulic cylinder 22 at an increasing speed, controller 54 may generate a control signal that causes displacement control valve 132 to move a greater extent toward its second position, at which a greater amount of pressurized fluid from charge circuit 52 (i.e., from common passage 116) may be directed through displacement control valve 132 and into first chamber 136. The increasing amount of pressurized fluid directed into first chamber 136 may cause movement of displacement actuator 134 that increases a positive displacement of primary pump 50, such that fluid is discharged from primary pump 50 at a greater rate into rod-end passage 58. At this same time, CPP 96 may be communicated with tank 99 via displacement control valve 132, such that load-holding valves 86, 88 are moved to and/or maintained in their flow-passing positions, thereby allowing the pressurized fluid within rod-end passage 58 to enter second chamber 44 and the fluid within first chamber 42 to be drawn back to primary pump 50 via head-end passage 56.

To extend hydraulic cylinder 22 at an increasing speed, controller 54 may generate a control signal that causes displacement control valve 132 to move a greater extent toward its third position, at which a greater amount of pressurized fluid from charge circuit 52 (i.e., from common passage 116) may be directed through displacement control valve 132 and into second chamber 140. The increasing amount of pressurized fluid directed into second chamber 140 may cause movement of displacement actuator 134 that increases a negative displacement of primary pump 50, such that fluid is discharged at a greater rate from primary pump 50 into head-end passage 56. At this same time, CPP 96 may be communicated with tank 99 via displacement control valve 132, such that load-holding valves 86, 88 are moved to and/or maintained in their flow-passing positions, thereby allowing the pressurized fluid within head-end passage 56 to enter first chamber 42 and the fluid within second chamber 44 to be drawn back to primary pump 50 via rod-end passage 58.

Regeneration of fluid may be possible during extending operations of hydraulic cylinder 22, such that an extending speed of hydraulic cylinder 22 may be increased. Specifically, during the extending operation described above, controller 54 may cause regeneration valve 78 to move to its flow-passing position, such that fluid discharging from second chamber 44 may be directed through passage 80 and join with fluid from primary pump 50 entering first chamber 42. At this same time, load-holding valve 88 may be caused to move alone to its flow-blocking position such that fluid returning from second chamber 44 to primary pump 50 may be inhibited. In this manner, a greater amount of fluid may be regenerated and hydraulic cylinder 22 may be capable of higher speeds. As described above, load-holding valve 88 may be caused to move to its flow-blocking position in any one of three different ways, including through use of regeneration control valve 160 (referring to the embodiment of FIG. 2), through the use of regeneration valve 162 (referring to the embodiment of FIG. 4), or through the use of displacement control valve 166 (referring to the embodiment of FIG. 5).

When an operator stops requesting movement of hydraulic cylinder 22 (e.g., when the operator releases interface device 37), controller 54 may correspondingly signal displacement control valve 132 to move to its first or neutral position. When displacement control valve 132 is in its first position, first and second chambers 136, 140 of displacement actuator 134 may both be simultaneously exposed to substantially similar pressures (e.g., simultaneously connected to both common and return passages 116, 120), thereby allowing displacement actuator 134 to center itself and destroke primary pump 50. At this same time, CPPs 96 associated with load-holding valves 86, 88 may both be simultaneously blocked from tank 99 via displacement control valve 132, thereby allowing pressure to build within CPP 96. As the pressure builds within CPP 96, load-holding valves 86, 88 may eventually be caused to move in tandem toward their flow-blocking positions, thereby effectively holding hydraulic cylinder 22 in its current position and hydraulically locking hydraulic cylinder 22 from movement. Operation may be similar when machine 10 is turned off and/or the operator activates a hydraulic lock-out switch (not shown).

In the disclosed embodiments of hydraulic system 46, flow provided by primary pump 50 may be substantially unrestricted such that significant energy is not unnecessarily wasted in the actuation process. Thus, embodiments of the disclosure may provide improved energy usage and conservation. In addition, the meterless operation of hydraulic system 46 may allow for a reduction or even complete elimination of metering valves for controlling fluid flow associated with hydraulic cylinder 22. This reduction may result in a less complicated and/or less expensive system.

In addition, the disclosed embodiments of hydraulic system 46 may provide for increased speeds of hydraulic cylinder 22. For example, the unique regeneration configurations of hydraulic system 46 may allow for a majority (if not all) of the fluid discharging from the rod-end chamber of hydraulic cylinder 22 to pass directly to and join with fluid from primary pump 50 in the head-end chamber during an extending operation, such that the extending speed of hydraulic cylinder 22 may be increased. In addition, the use of regeneration valve 78 to pass fluid from one chamber of hydraulic cylinder 22 to the other at low pressure drop, may help to reduce a size and/or speed of primary pump 50 required to adequately supply hydraulic cylinder 22 with operator demanded fluid flows.

It will be apparent to those skilled in the art that various modifications and variations can be made to the disclosed hydraulic system. Other embodiments will be apparent to those skilled in the art from consideration of the specification and practice of the disclosed hydraulic system. It is intended that the specification and examples be considered as exemplary only, with a true scope being indicated by the following claims and their equivalents.

What is claimed is:

1. A hydraulic system, comprising:

an actuator;

a pump having variable displacement;

first and second passages connecting the pump to the actuator in a closed-loop manner;

a first load-holding valve disposed within the first passage and movable between a flow-blocking position and a flow-passing position;

a second load-holding valve disposed within the second passage and movable between a flow-blocking position and a flow-passing position;

a regeneration valve connected to the first passage at a location between the actuator and the first load-holding valve and to the second passage at a location between the actuator and the second load-holding valve, the regeneration valve being configured to selectively fluidly connect the first passage with the second passage;

a control valve configured to initiate simultaneous movements of the first and second load-holding valves; and a controller in communication with the pump, the control valve, and the regeneration valve, wherein the controller is configured to:

cause the control valve to initiate simultaneous movement of the first and second load-holding valves toward their flow-blocking positions when a displacement of the pump is about zero;

selectively cause the regeneration valve to fluidly connect the first passage with the second passage when the displacement of the pump is non-zero; and cause only one of the first and second load-holding valves to move to its flow-blocking position when the regeneration valve fluidly connects the first passage with the second passage.

2. The hydraulic system of claim 1, wherein the controller is configured to cause only the first load-holding valve to move to its flow-blocking position when the pump supplies pressurized fluid through the second load-holding valve to the actuator.

3. The hydraulic system of claim 1, wherein the regeneration valve is spring-biased toward a flow-blocking position and solenoid operable toward a flow-passing position.

4. The hydraulic system of claim 1, wherein the regeneration valve is movable from a first position at which fluid communication between the first and second passages is blocked and movement of the first and second load-holding valves is unaffected by the regeneration valve, and a second position at which the first passage is fluidly communicated with the second passage and one of the first and second load-holding valves is caused to move to its flow-blocking position by the regeneration valve.

5. The hydraulic system of claim 4, wherein the one of the first and second load-holding valves is caused to move to its flow-blocking position when a control passage associated with the one of the first and second load-holding valves is blocked by the regeneration valve.

6. The hydraulic system of claim 1, further including:

a first control passage associated with the first load-holding valve; and a second control passage associated with the second load-holding valve, wherein:

a pressure of the first control passage affects movement of the first load-holding valve between the flow-passing position and the flow-blocking position;

a pressure of the second control passage affects movement of the second load-holding valve between the flow-passing position and the flow-blocking position; and the control valve is movable between a first position at which the first and second control passages are fluidly connected to a low-pressure tank, a second position at which only one of the first and second control passages is fluidly connected to the low-pressure tank, and a third position at which both of the first and second control passages are blocked from the low-pressure tank.

7. The hydraulic system of claim 6, wherein when the first or second control passages is blocked from the low-pressure tank, a pressure within the first or second control passage builds and causes the first or second load-holding valves to move towards the flow-blocking position.

8. The hydraulic system of claim 1, further including:

a first control passage associated with the first load-holding valve; and a second control passage associated with the second loading valve, wherein:

a pressure of the first control passage affects movement of the first load-holding valve between the flow-passing position and the flow-blocking position;

a pressure of the second control passage affects movement of the second load-holding valve between the flow-passing position and the flow-blocking position; and the control valve is movable between a first position at which the first and second control passages are fluidly connected to a low-pressure tank, a second position at which both of the first and second control passages are blocked from the low-pressure tank, and a third position at which the first and second control passages are fluidly connected to a low-pressure tank.

9. The hydraulic system of claim 8, wherein when the first and second control passages are blocked from the low-pressure tank, pressures within the first and second control passage build and cause the first and second load-holding valves to move towards the flow-blocking positions.

10. The hydraulic system of claim 1, wherein the control valve is also configured to control a displacement of the pump.

11. The hydraulic system of claim 1, wherein the control valve is a first control valve and the hydraulic system further includes a second control valve configured to initiate movement of only one of the first and second load-holding valves when the regeneration valve fluidly connects the first passage with the second passage.

12. The hydraulic system of claim 11, wherein the second control valve is fluidly connected to a control passage that extends between one of the first and second load-holding valves and the first control valve.

13. The hydraulic system of claim 11, wherein the second control valve is spring biased toward a flow-passing position and solenoid operated toward a flow-blocking position.

14. The hydraulic system of claim 1, further including:

a first control passage associated with the first load-holding valve;

a first pilot passage fluidly connecting a downstream portion of the first passage with a first end of the first load-holding valve;

a second pilot passage fluidly connecting an upstream portion of the first passage with the first end of the first load-holding valve;

a third pilot passage fluidly connecting the upstream portion of the first passage with the first control passage;

a second control passage associated with the second load-holding valve;

a fourth pilot passage fluidly connecting a downstream portion of the second passage with a first end of the second load-holding valve;

a fifth pilot passage fluidly connecting an upstream portion of the second passage with the first end of the second load-holding valve; and a sixth pilot passage fluidly connecting the upstream portion of the second passage with the second control passage, wherein the third and sixth pilot passages are restricted.

15. The hydraulic system of claim 1, further including:

a charge circuit;

at least one makeup valve fluidly connected between the charge circuit and the first and second passages; and at least one relief valve fluidly connected between the charge circuit and the first and second passages, wherein the at least one makeup valve and the at least one relief valve connect to the first and second passages at locations between the actuator and the first and second load-holding valves.

16. A hydraulic system, comprising:

an actuator;

a pump having variable displacement;

first and second passages connecting the pump to the actuator in a closed-loop manner;

a first load-holding valve disposed within the first passage and movable between a flow-blocking position and a flow-passing position;

a second load-holding valve disposed within the second passage and movable between a flow-blocking position and a flow-passing position;

a regeneration valve connected to the first passage at a location between the actuator and the first load-holding valve and to the second passage at a location between the actuator and the second load-holding valve, the regeneration valve being configured to selectively fluidly connect the first passage with the second passage;

a control valve configured to initiate simultaneous movements of the first and second load-holding valves;

a charge circuit;

at least one makeup valve fluidly connected between the charge circuit and the first and second passages, the at least one makeup valve being connected to the first and second passages at locations between the pump and the first and second load-holding valves;

at least one relief valve fluidly connected between the charge circuit and the first and second passages, the at least one relief valve being connect to the first and second passages at locations between the actuator and the first and second load-holding valves; and a controller in communication with the pump, the control valve, and the regeneration valve, wherein the controller is configured to:

cause the control valve to initiate simultaneous movement of the first and second load-holding valves toward their flow-blocking positions when a displacement of the pump is about zero;

selectively cause the regeneration valve to fluidly connect the first passage with the second passage when the displacement of the pump is non-zero; and cause the regeneration valve to move only the first load-holding valve to its flow-blocking position when the regeneration valve fluidly connects the first passage with the second passage and when the pump supplies pressurized fluid through the second load-holding valve to the actuator, wherein the regeneration valve is movable from a first position at which fluid communication between the first and second passages is blocked and movement of the first and second load-holding valves is unaffected by the regeneration valve, and a second position at which the first passage is fluidly communicated with the second passage and one of the first and second load-holding valves is caused to move to its flow-blocking position by the regeneration valve.

17. A method of operating a hydraulic system, comprising:

pressurizing fluid with a pump;

directing fluid from the pump through an actuator and back to the pump in a closed-loop manner via first and second passages;

selectively simultaneously blocking the first and second passages with first and second load-holding valves to inhibit movement of the actuator when a displacement of the pump is about zero;

selectively fluidly connecting the first passage with the second passage at locations between the actuator and the first and second load-holding valves via a regeneration valve when the displacement of the pump is non-zero; and selectively blocking only one of the first and second passages with the first or second load-holding valves when the first and second passages are fluidly communicated with each other via the regeneration valve.

18. The method of claim 17, wherein:

selectively simultaneously blocking the first and second passages with first and second load-holding valves is initiated by movement of a pump displacement control valve; and selectively blocking only one of the first and second passages with the first or second load-holding valves is initiated by movement of the regeneration valve.

19. The method of claim 17, wherein selectively simultaneously blocking the first and second passages with first and second load-holding valves and selectively blocking only one of the first and second passages with the first or second load-holding valves are both initiated by movement of a control valve.

20. The method of claim 17, wherein:

selectively simultaneously blocking the first and second passages with first and second load-holding valves is initiated by movement of a pump displacement control valve; and selectively blocking only one of the first and second passages with the first or second load-holding valves is initiated by movement of regeneration control valve.

* * * * *